United States Patent
Meullenet

(10) Patent No.: US 8,225,645 B2
(45) Date of Patent: Jul. 24, 2012

(54) APPARATUS AND METHOD FOR PREDICTING MEAT TENDERNESS

(75) Inventor: Jean-Francois Charles Meullenet, Fayetteville, AR (US)

(73) Assignee: The Board of Trustees of the University of Arkansas, Little Rock, AR (US)

( * ) Notice: Subject to any disclaimer, the term of this patent is extended or adjusted under 35 U.S.C. 154(b) by 422 days.

(21) Appl. No.: 12/442,026

(22) PCT Filed: Sep. 20, 2007

(86) PCT No.: PCT/US2007/020409
§ 371 (c)(1),
(2), (4) Date: Dec. 2, 2009

(87) PCT Pub. No.: WO2008/036373
PCT Pub. Date: Mar. 27, 2008

(65) Prior Publication Data
US 2010/0221395 A1    Sep. 2, 2010

Related U.S. Application Data

(60) Provisional application No. 60/846,214, filed on Sep. 21, 2006.

(51) Int. Cl.
G01N 33/12    (2006.01)
G01N 3/24    (2006.01)
(52) U.S. Cl. ............................ 73/81; 426/231
(58) Field of Classification Search ....... 73/81; 426/231
See application file for complete search history.

(56) References Cited

U.S. PATENT DOCUMENTS

| | | | |
|---|---|---|---|
| 3,493,774 A | 2/1970 | Knudsen | |
| 3,956,924 A | 5/1976 | Hansen et al. | |
| 4,052,890 A | 10/1977 | Kammlah et al. | |
| 4,939,927 A | 7/1990 | Johnston | |
| 6,001,655 A | 12/1999 | Spadaro et al. | |
| 6,088,114 A | 7/2000 | Richmond et al. | |
| 6,363,328 B1 | 3/2002 | Nadeau | |
| 6,563,580 B1 | 5/2003 | Aignel et al. | |

OTHER PUBLICATIONS

K. F. Warner. 1928. Progress report of the mechanical test for tenderness of meat. Proc. Am. Soc. Anim. Prod. 21:114.*
S. D. Shackelford, T. L. Wheeler, and M. Koohmaraie, "Evaluation of Slice Shear Force as an Objective Method of Assessing Beef Longissimus Tenderness," J. Anim. Sci. 1999. 77:2693-2699.*
(J. W. Stephens, J. A. Unruh, M. E. Dikeman, M. C. Hunt, T. E. Lawrence, and T. M. Loughin, "Mechanical probes can predict tenderness of cooked beef longissimus using uncooked measurements," J. Anim. Sci. 2004. 82:2077-2086.*

(Continued)

*Primary Examiner* — Lisa Caputo
*Assistant Examiner* — Punam Roy
(74) *Attorney, Agent, or Firm* — J. Charles Dougherty

(57) ABSTRACT

An apparatus and method for predicting meat tenderness, particularly with respect to raw meat, is disclosed. The invention does not require the removal or destruction of any cuts of meat from the carcass to which the method is applied. The method allows for the identification of tender meat product that might not be identified as tender using conventional United States Department of Agriculture quality grading methods. The method includes the insertion of one or more blunt, flat-tipped blades into a meat sample, measuring a value such as stress, force, or energy upon insertion of the blade, and calculating a tenderness factor therefrom based on a tenderness threshold.

13 Claims, 7 Drawing Sheets

OTHER PUBLICATIONS

W. H. Black, K.F. Warner, and C.V. Wilson, "Beef production and quality as affected by grade of steer and feeding grain supplement on grass," USDA, Washington, DC, (1931), vol. 217, 1.*

Cavitt, L.C. et al., Prediction of Poultry Meat Tenderness Using Razor Blade Shear, Allo-Kramer Shear, and Sarcomere Length, Journal of Food Science, vol. 69, Nr. 1, SNQ11-15 (2004) (web published on Jan. 7, 2004).

Cavitt, L.C. et al., The Relationship of Razor Blade Shear, Allo-Kramer Shear, Warner-Bratzler Shear and Sensory Tests to Changes in Tenderness of Broiler Breast Fillets, Journal of Muscle Foods 16, 223-242 (2005).

Belk, K.E. et al., Evaluation of the Tendertec Beef Grading Instrument to Predict the Tenderness of Steaks and Beef Carcasses, Journal of Animal Science 79:688-97 (2001).

George, M.H. et al., Comparison of USDA Quality Grade with Tendertec for the Assessment of Beef Palatability, Journal of Animal Science 75:1538-1546 (1997).

Shackleford, S.D. et al., Tenderness Classification of Beef: II. Design and Analysis of a System to Measure Beef Longissimus Shear Force under Commercial Processing Conditions, Journal of Animal Science 77:1474-1481 (1999).

* cited by examiner

APPARATUS AND METHOD FOR PREDICTING MEAT TENDERNESS

This application claims priority from U.S. provisional patent application Ser. No. 60/846,214, entitled "Apparatus and Method for Predicting Meat Tenderness," and filed on Sep. 21, 2006.

BACKGROUND OF THE INVENTION

The invention relates to methods and devices for predicting the tenderness of a selection of meat. In particular, the invention relates to methods and devices for predicting the tenderness of a selection of meat using a blade or blades that penetrate the selection of meat.

Accurately predicting the tenderness of a particular selection of meat when fully cooked, particularly the tenderness of beef and pork cuts, is a major concern within the protein industry. While it is well known that consumers find tender meat cuts more desirable, the tenderness of meat cuts—in particular the tenderness of beef and pork cuts—tends to vary considerably. Tenderness is thus of critical importance to the producer since, due to the higher desirability of more tender meats in the eyes of the consumer, a higher price may be commanded for more tender meats. By accurately identifying the more tender meat cuts during slaughter and processing, the producer may receive the highest return for its meats, while at the same time providing the consumer with the most consistent and desirable product. The importance of an accurate method of predicting meat tenderness has thus been long recognized, and a number of methods have been proposed or developed for making such predictions based on various observations or measurements performed on meat products.

Within the United States, beef is graded by the United States Department of Agriculture (USDA) for yield and quality according to subjective grading criteria. These criteria include the degree of marbling of the beef and the maturity of the animal when slaughtered. Maturity is determined by an inspector based on a visual inspection of the carcass. With respect to quality grading, the higher categories for beef are "prime" and "choice." A prime meat, the highest quality grade, will come from the carcass of a young animal and will exhibit abundant marbling.

Inspection of a beef carcass according to the USDA's method requires that a series of precise cuts be performed in order to produce a sample for inspection. Because the USDA quality inspection criteria are qualitative and based only on visual inspection, the quality of the results is dependent upon the skill and experience of the inspector. In addition, it will be seen that to the extent that actual meat tenderness does not correlate to the visual criteria used for this inspection, the correlation between the quality grade assigned and the meat tenderness will be low. Specifically, it is known that the USDA quality grading method will typically produce a lower grade for a meat that has a low quantity of intramuscular fat. It is believed, however, that approximately fifty percent of beef carcasses exhibiting low intramuscular fat content will in fact produce relatively tender meats. If those carcasses with more tender meats could be identified from within this group of low intramuscular fat carcasses, they could potentially command a significantly higher return, thereby increasing the value associated with each such carcass, and providing the consumer with a final meat product with a more predictable tenderness.

In addition to qualitative methods such as performed by the USDA, the art also includes a number of attempts to provide quantitative methods for analyzing meat tenderness or overall quality. In particular, a number of methods of predicting meat tenderness based on optical properties have been suggested. For example, U.S. Pat. No. 3,493,774 to Knudsen teaches a method of comparing the color of a meat specimen immediately after a cut is made to a known color sample. U.S. Pat. No. 6,088,114 to Richmond et al. teaches a method based on the principle that connective tissues in meat fluoresce when exposed to particular wavelengths of ultraviolet light. This method involves the insertion of a probe into a carcass where the probe includes an ultraviolet light source. Similarly, U.S. Pat. No. 6,363,328 to Nadeau teaches a meat probe and artificial neural network that predicts tenderness based on collected fluorescence data from meat connective tissue. U.S. Pat. No. 6,563,580 to Aignel et al. teaches a method for determining beef quality based upon the measurement of the absorption properties of the meat in the visible to near-infrared range.

Another class of methods for measuring meat tenderness involves the measurement of various mechanical properties of the meat. Physical probes of various sorts are inserted into the meat for this purpose. For example, U.S. Pat. No. 4,052,890 to Kammlah et al. teaches a method involving a pointed probe that is inserted directly into a cooked round, whereby the force required to penetrate the meat is measured and correlated to tenderness. Another such method of predicting meat tenderness, based on a determination of a "stress relaxation coefficient" of a meat sample, is taught by U.S. Pat. No. 6,001,655 to Spadaro et al. In the Spadaro et al. method, a meat sample is subjected to a compressive force, and the change in force over time and the change in sample size over time is used in order to derive the stress relaxation coefficient. This coefficient is then aggregated with other physical parameters and correlated to meat tenderness. U.S. Pat. No. 4,939,927 to Johnson teaches a meat probe with two separate pistons driving a cone-shaped probe. A scale associated with each piston measures the depth of penetration of the probe and the force required for penetration; these measures are then correlated to tenderness.

To the inventor's knowledge, none of these prior art devices have proven successful in the marketplace. For example, an independent evaluation of the Johnson meat probe (known as the "Tendertec" instrument) performed by researchers at Colorado. State University concluded that the device failed to consistently detect tenderness differences in steaks derived from a large number of carcasses. The inventor hereof believes that one of the fundamental problems with these devices is their inherent lack of accuracy and repeatability. The two-spring arrangement of the Tendertec instrument, for example, is not believed to provide sufficiently accurate and repeatable force measurements to discriminate between tender and tough meats consistently. In addition, the inventor hereof believes that the shape of the probe in such devices appears inappropriate for measuring tenderness, as it does not imitate the interaction of human teeth with meats of varying tenderness.

A razor blade shear method of predicting tenderness has recently been developed by L. C. Cavitt and others for use with respect to cooked poultry meat. In this method, a sharpened razor blade is inserted into a cooked breast fillet and the shear force and shear energy associated with the insertion of the blade is measured. This method offers advantages in that no sample cutting or weighing is required in order to conduct the test, and the test is minimally destructive since only a small blade incision is made in the test sample. This method is not believed to be effective, however, in predicting the tenderness of raw meats.

Within the beef industry, the instrument-based tenderness prediction method most commonly employed today is the Warner-Bratzler shear method. This method has been employed within the industry as an adjunct to USDA tenderness grading for many years. Like the Cavitt poultry method described above, the Warner-Bratzler method is performed with respect to a cooked meat sample that has been previously collected from a carcass. Preferably, this sample is an approximately one-inch thick steak removed from the longissimus dorsi muscle, which is then cooked to a pre-determined internal temperature. Cores are then collected from the cooked steak, typically six to eight in total, with each core being removed parallel to the orientation of the muscle fibers and being of a precise size, typically 1.27 cm in diameter. A specialized shear machine is then employed to measure the resistance of the core sample to a cutting force applied across its surface. The core is sheared perpendicular to the muscle fibers by a triangular-shaped, blunt-ended blade. The Warner-Bratzler method has been shown to produce accurate tenderness predictions for cooked meats, but has not been shown effective in predicting tenderness from testing of raw meats.

A newer instrument-based method for predicting beef tenderness has been developed by S. D. Shackleford and others at the Roman L. Hruska U.S. Meat Animal Research Center at Clay Center, Nebraska. This method is generally analogous to the Warner-Bratzler method, except that a 1 cm thick, 5 cm long slice is removed from each of the samples parallel to the muscle fibers. These slices are then sheared perpendicular to the fibers by a flat, half-round blade. Like the Warner-Bratzler method, this method has been shown by experimental results to accurately categorize carcasses into tenderness groups. Also like the Warner-Bratzler method, however, this method is limited to testing on cooked samples removed from the beef carcass.

While the Warner-Bratzler and Shackleford instrument-based methods for predicting beef tenderness described above have proven to be good predictors, it will be seen from the above description that these methods involve a lengthy and expensive process for the meat producer. Steaks must be cut from the carcass, the steaks must be cooked, and then samples must be precisely cut from those steaks and sheared. In addition, the validity of the shear measurements depends strongly upon the ability of the operator to determine fiber orientation within the sample. The steaks cut for the tenderness evaluation are lost, thereby reducing the yield from every tested carcass. What is desired then is an instrument-based, quantitative method for predicting meat tenderness, particularly beef and pork tenderness, that may be performed quickly and inexpensively, specifically could be performed with respect to uncooked meat, and ideally could be performed upon a beef or pork carcass without ruining the usability of any of the meat from the carcass and without slowing down production in the processing plant where the predictive method is being performed. Such a method could ideally be employed in conjunction with the standard. USDA visual tenderness grading process.

SUMMARY OF THE INVENTION

An apparatus and method for predicting beef tenderness is described that may be performed with respect to raw meat, especially a beef or pork carcass, without removing or destroying any of the cuts of meat from the carcass. The apparatus and method are ideally suited but not limited to the analysis of meats that might not receive high scores according to USDA quality grading methods, but might nevertheless represent tender product. As a result, a greater return on meat products may be realized because more tender meats are identified, and a more consistent product provided for the meat consumer. Because the method may be performed on the carcass itself, rather than prepared samples, it may be performed quickly and efficiently during the animal slaughtering operation.

Thus, a method for predicting meat tenderness is described. It comprises the steps of inserting a blade into a raw meat sample; measuring at least one of the following, the force or energy or stress, at the blade for the sample; and predicting a tenderness for the sample based on the measurement.

An apparatus for predicting tenderness of a raw meat sample comprises a blunt blade comprising a flat tip and a measuring instrument in communication with the blade. The measuring instrument measures at its blade at least one of the force, energy, and stress.

Further, an apparatus for measuring tenderness for a meat product, may comprise a flat-tipped, blunt blade; a measuring instrument in communication with said blade; a controller in communication with the measuring instrument; and a calculating device. The controller is capable of controlling the depth and speed of the blade's penetration. The calculating device is operable to receive input data from the measuring instrument and output a tenderness indicator.

In addition, meat tenderness may be improved by using a method comprising the steps of (a) associating each of a plurality of animals within the animal population with an identifier; (b) slaughtering said animals; (c) determining a meat tenderness measurement associated with each of said animals; (d) associating each said meat tenderness measurement with that one of said identifiers corresponding to that one of said animals; and (e) performing a statistical analysis of said meat tenderness measurements to determine one of a breed or lineage of said animals associated with tender meats.

Thus, an apparatus and method for predicting meat tenderness are described that may be employed with respect to raw meats, and particularly with respect to animal carcasses.

Further described are an apparatus and method for predicting meat tenderness that may be employed without removing or destroying any sample from the meat product to be tested.

Also, an apparatus and method for predicting meat tenderness is described that may be employed without delaying production at a meat processing facility.

This apparatus and method for predicting meat tenderness may be employed in conjunction with USDA meat inspection and grading procedures.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENTS

Figure 1A:
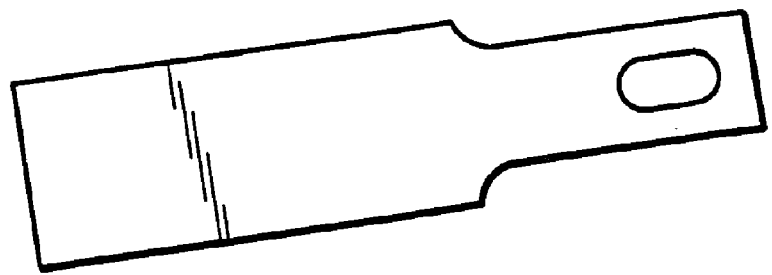
FIG. 1A is a drawing providing a side view of a blunt, flat-tipped razor blade according to a first preferred embodiment of the present invention.
Figure 1B:
FIG. 1B is a drawing providing an on-edge view of a blunt, flat-tipped razor blade according to a first preferred embodiment of the present invention.
Figure 2:
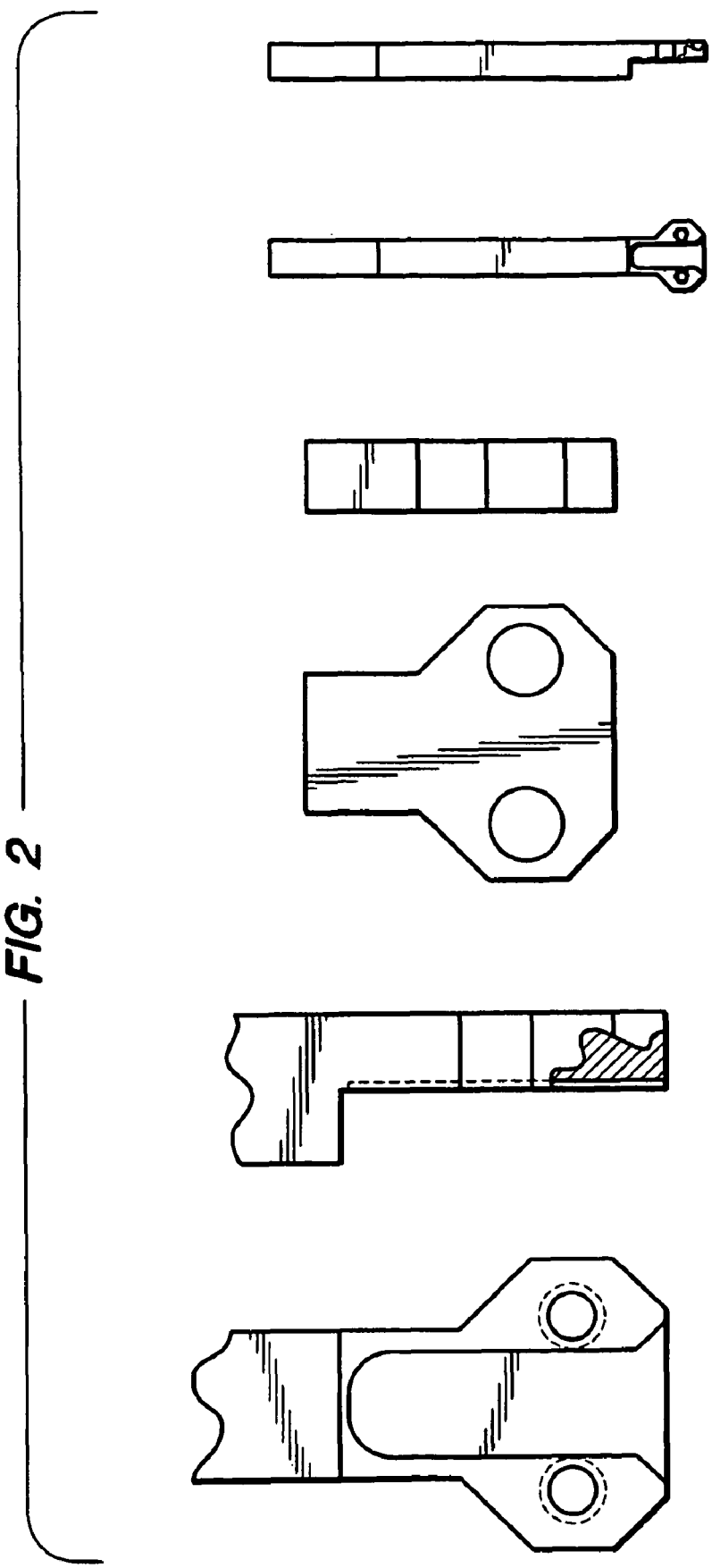
FIG. 2 is a drawing showing several views of a razor blade holder according to a first preferred embodiment of the present invention.
Figure 3:
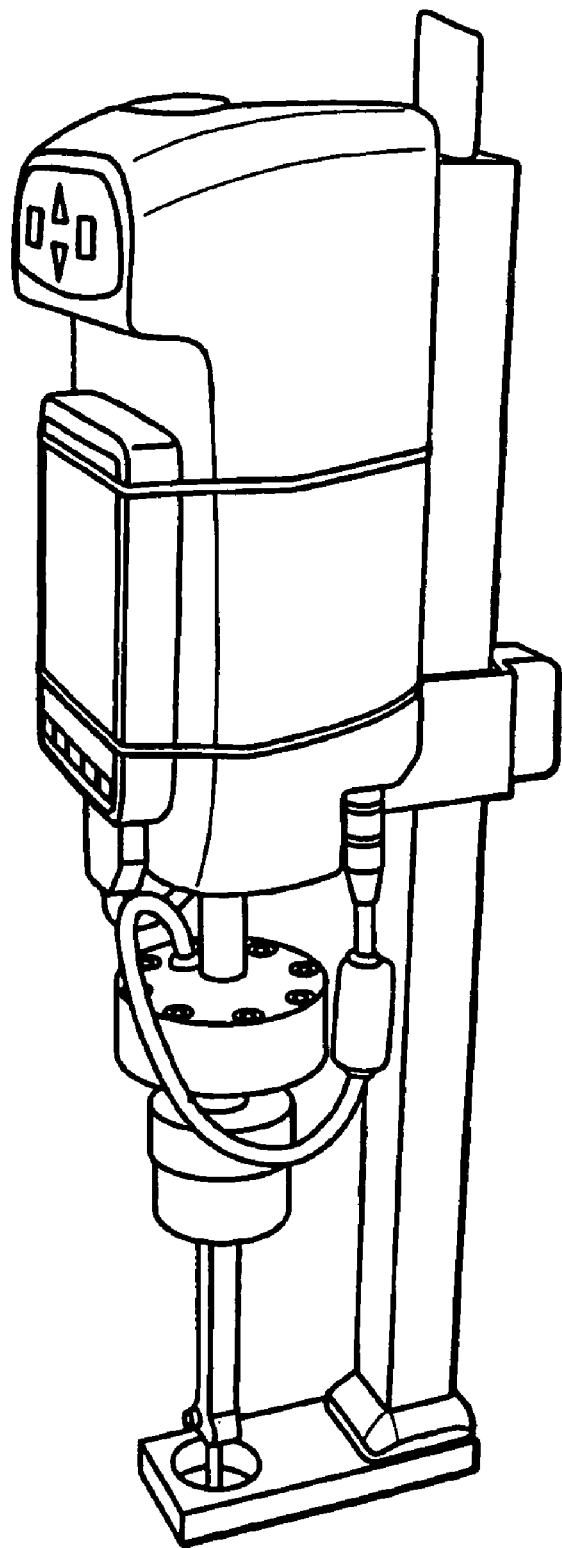
FIG. 3 is a depiction of a shear machine used in conjunction with a first preferred embodiment of the present invention.

With reference to FIGS. 1-3, a first preferred embodiment of the present invention is described. The device comprises a blunt, flat-tipped razor blade or blades as shown in FIGS. 1A and 1B.

As seen in FIG. 1B, the device further comprises a blunt blade with a flat tip. A sharpened blade does not provide sufficient resolution to distinguish between tougher and more tender meats when presented with respect to raw meat, particularly raw meat integral to the meat carcass. Other blade configurations, such as the half-round blade configuration of the Shackleford method described above, are believed to push between fibers within the meat rather than shear through them, thereby making such blade configurations less desirable.

Sharpened blades, while potentially appropriate for more tender meat, are believed to not provide a sufficiently discriminative measure of shear force in tougher grades of meats. In addition, it is difficult to precisely define the sharpness of a sharpened blade, and the sharpness of a sharpened blade will degrade quickly during use, thereby lowering the consistency of the readings received from repeated use of the device, particularly in a high-volume production environment.

In addition, half-round blades and pointed probes, which have also been employed for tenderness determinations in cooked meats, are believed less capable of discriminating tenderness of meats due to a tendency of such blades and probes to push between or compress muscle fibers in the meat rather than shear through them.

In the first preferred embodiment, the single blade has a height of 21.15 mm, a width of 8.91 mm, and a thickness of 0.51 mm. The blade is flat-tipped in the sense that the tip of the blade, when viewed from the side as shown in FIG. 1A, forms a straight line perpendicular to the axis along with the blade travels when inserted into the meat being tested. This configuration is distinct from, for example, a pointed blade, where the length of the blade in the direction of penetration is greater at one edge of a side than the other. This configuration is also distinct from a serrated blade, whereby multiple points would extend along the edge of the blade as viewed from the side.

Also, as shown in FIG. 1B, the leading edge of the blade is blunt. That is, the edge that penetrates the meat forms a flat surface perpendicular to the direction of penetration. This configuration may be contrasted with, for example, a sharpened blade, where the leading edge as viewed in FIG. 1B would form an angle with the direction of penetration. This configuration may also be contrasted with, for example, a half-round blade, where the leading edge as viewed in FIG. 1B would form a semi-circular shape rather than a flat edge.

The blade is mounted in a blade holder as shown in FIG. 2. The purpose of the blade holder is to secure the blade in place without slippage, which would impact the accuracy of measurements performed using the device. The blade holder is also intended to enable easily changing the blade when necessary.

The blade holder is mounted on a material testing instrument. In this embodiment, an Inspec 2200 portable instrument was used, as shown in FIG. 3. This machine is available from Instron Corporation of Norwood, Mass. Also in this embodiment, the testing instrument is equipped with a load cell, preferably with a capacity of about 125 N, that is connected to the material testing instrument in such a way that forces impinging on the blades are measured by the load cell. Also in this embodiment, an electronic controller is used to set the speed and depth of penetration of the blades into the meat. Various other sorts of controllers could be used in alternative embodiments. Also in this embodiment, a calculating device, such as a PalmPilot device produced by Palm, Inc. of Sunnyvale, Calif., is used to receive data from the load cell, store the data, perform calculations on the data, and display the data obtained from the blade penetrating the meat. Various other sorts of calculating devices could be used in alternative embodiments. The Instron instrument is highly accurate, providing a strain gauge based load cell with an accuracy of at least 1% of reading down to 10% of its 125N capacity. A self-calibration feature also enhances the accuracy and reliability of the device when used in a production environment.

Figure 4:
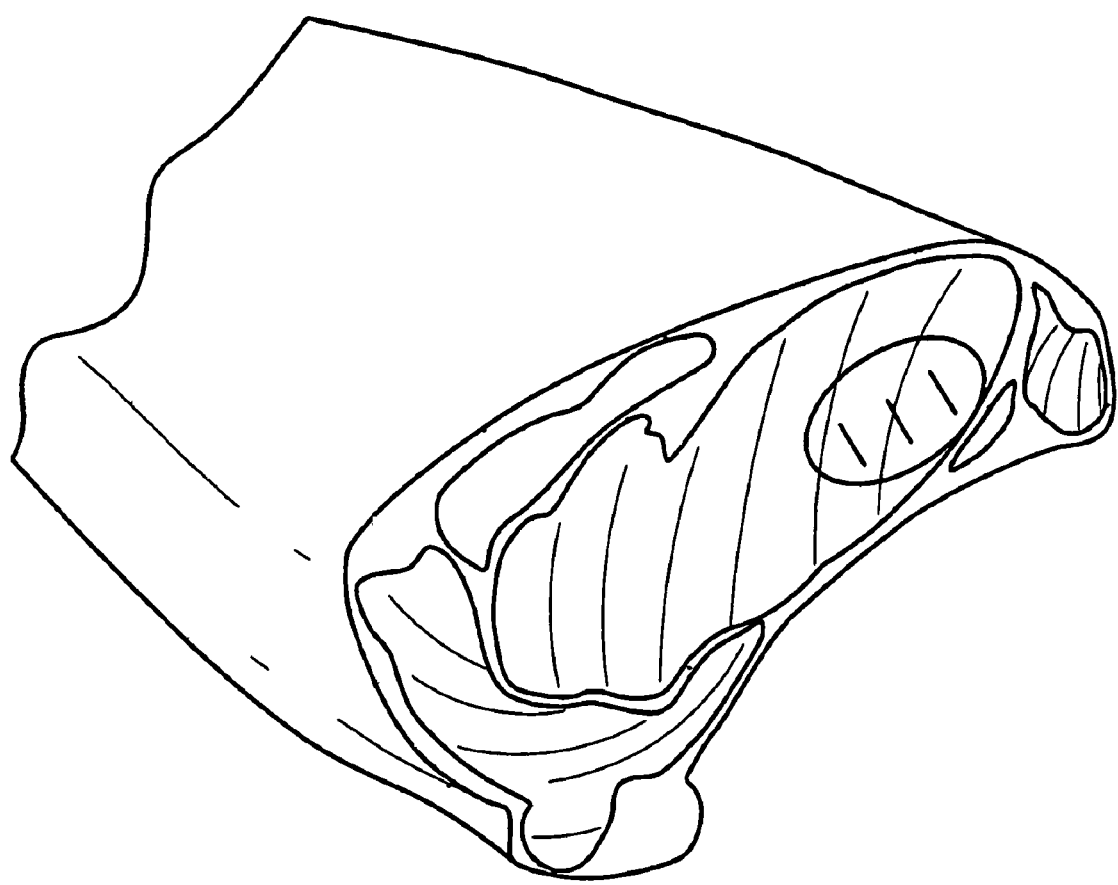
FIG. 4 is a depiction of the sampling area on the rib eye portion of a beef carcass according to a preferred embodiment of the present invention.

Every carcass is split such that there is an exposed surface of the longissimus dorsi muscle at the 12th rib, as shown in FIG. 4. The shear cuts are then made using the device described above in triplicates in the eye of the rib eye, also as illustrated in FIG. 4.

The crosshead speed (that is, the blade travel speed) of the shear machine is preferably set to 10 mm/s for a total penetration depth of 10 to 20 mm, most preferably about 20 mm. It may be seen that at this speed a test cut may be performed in the span of 4 seconds. Since a typical beef processing facility processes a single carcass on the production line every 10 seconds, a cut or cuts using the preferred embodiment would not slow the production line.

Figure 5:
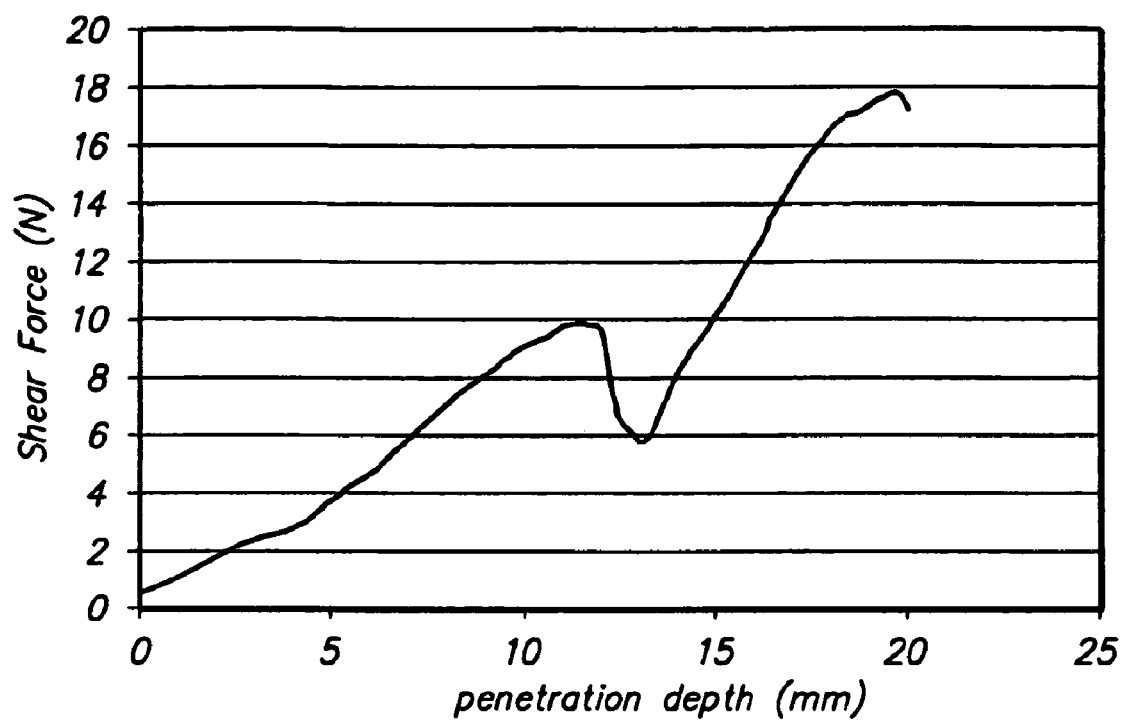
FIG. 5 is a sample force-penetration curve generated during utilization of a preferred embodiment of the present invention.
Figure 6:
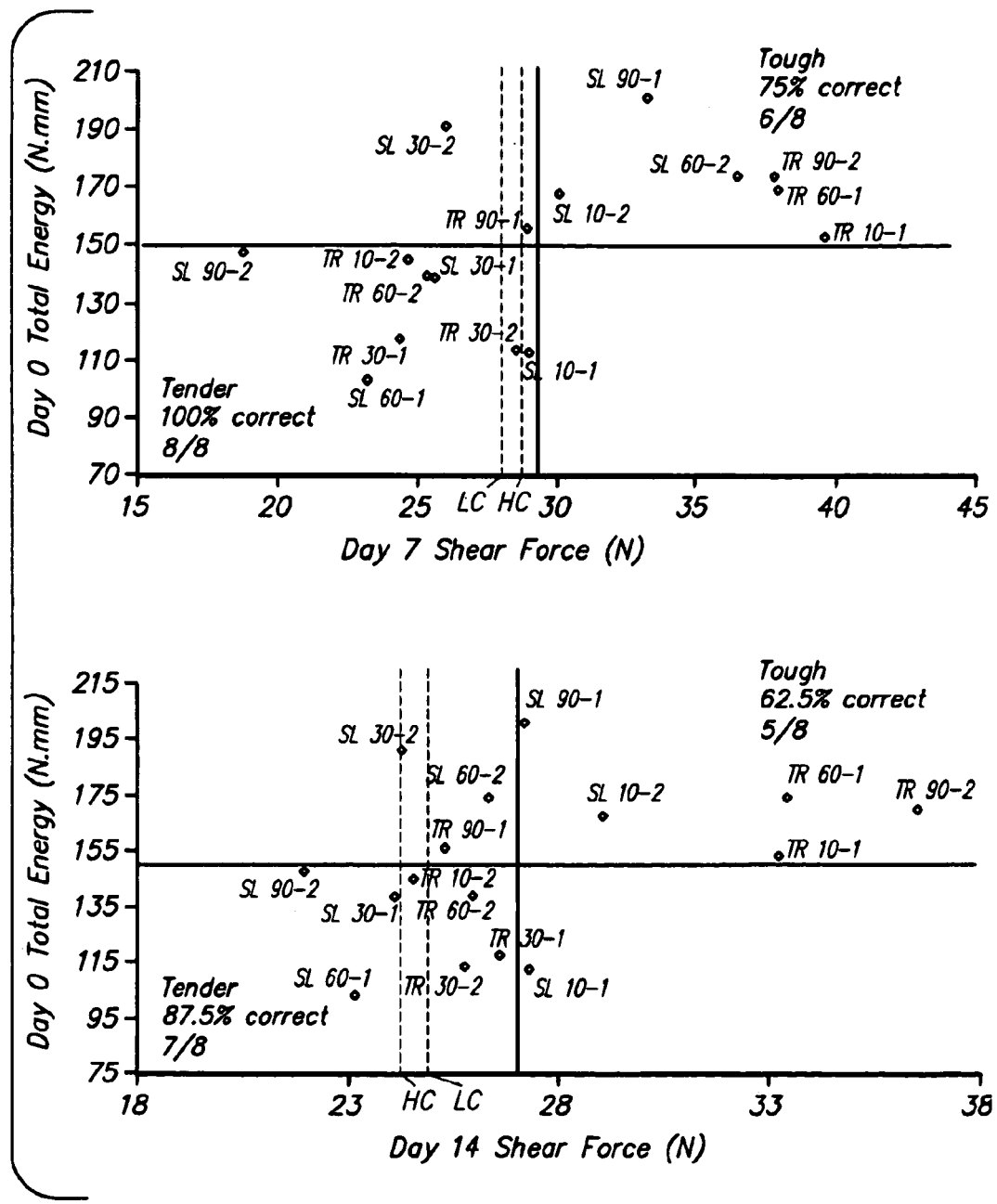
FIG. 6 is a set of graphs showing sample tenderness predictive data generated during utilization of a preferred embodiment of the present invention.

The data resulting from these cuts is provided by the control device in the form of a force-penetration curve, as illustrated in FIG. 5. From this curve, several indices may be calculated, including the total shear energy (TE) necessary to shear through the rib eye that was tested. This index is used to determine if the carcass evaluated will yield tender or tough meat. Experiments have shown that using a single blade, a TE value of about 150 N·mm separates tough from tender carcasses. In other words, those carcasses where the rib eye was found to have a TE of greater than about 150 N·mm tended to be tough, while those with a TE of less than about 150 N·mm tended to be tender. The determination of whether a tested carcass was in fact tough or tender was performed by qualitative evaluation, such as taste testing, as known in the art.

In alternative embodiments, compound blade shapes may be employed other than that shown in FIGS. 1A and 1B. For example, a "cross" shape, wherein the blade is configured as essentially two flat-tipped blades as already described crossing over each other, may be employed. Numerous other geometric arrangements may also be possible, including "star," square, and circular shapes.

In yet other embodiments, a variety of force or energy or stress measurements may be taken, such as stress in the blade or blades or other portions of the testing instrument, the strain of the blade or blades or other portions of the testing instrument, or the shear energy of the penetration of the blade into the meat. It will be evident to one skill in the art that force, energy and stress are all indices for the resistance of the meat to penetration by the blade, which in turn has been found by the inventor to correlate with the tenderness of the meat.

Figure 7:
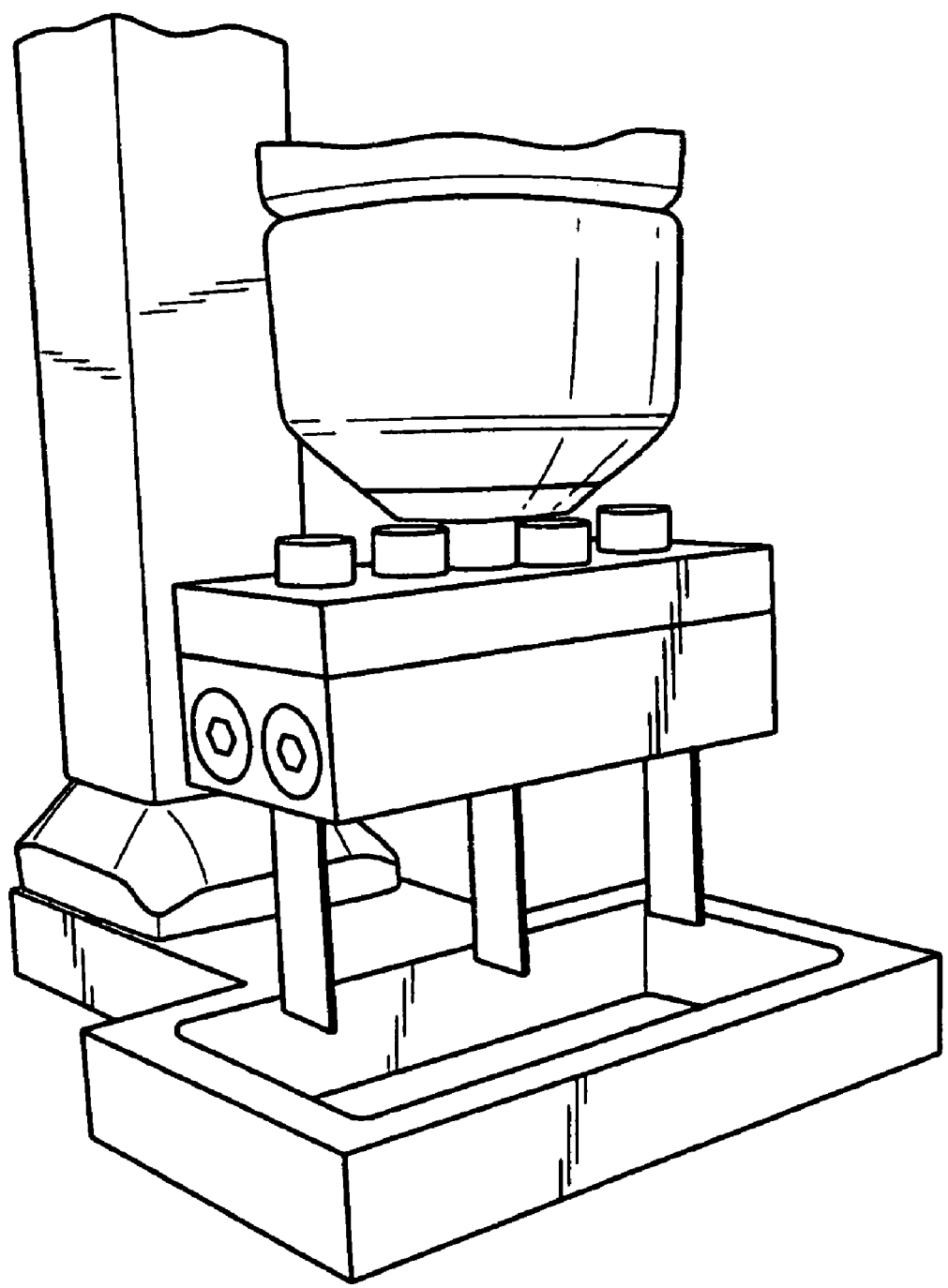
FIG. 7 is a depiction of a second preferred embodiment of the present invention incorporating three blades.

While the device tested and described above uses a single blade, a production device in a second preferred embodiment has multiple blades arranged for simultaneous parallel or non-parallel cuts, with three to four blades being currently considered the optimal configuration. Additional cuts will increase the accuracy of the measurement performed by providing additional data that may be aggregated. By performing these cuts simultaneously, the time required for performing a test is reduced. To this end, a device comprising three parallel blades was successfully tested in plant trials, as shown in FIG. 7. The preferred multi-blade embodiment is preferably employed in a production facility after the USDA inspection and grading process is completed.

In order to receive accurate measurements, it is important, that the blade cut into the meat rather than simply depress the surface of the meat. The blade configuration of the multi-blade preferred embodiment is well suited for insertion into a meat sample that is still integral with the meat carcass. The use of a similar blade configuration on a sample that is already removed from the carcass is believed to not predict tenderness because removed samples are more easily compressed. The carcass appears to provide support for the sample that prevents or limits such compression, and thereby allowing an accurate measurement and the resulting high correlation between measured results for shear energy and qualitative meat tenderness.

In experiments featuring a device comprising 3 parallel blades, a maximum shear force value rather than a shear energy was used to separate tender from tough carcasses. With this preferred embodiment, 40N was found to be the force separating tender from tough meats. In plant trials with 90 carcasses selected to represent USDA select and choice grades, carcasses with shear force measurements of less than 40N were found to be significantly more acceptable for tenderness by a panel of 88 consumers.

In addition, the carcasses predicted to be tender by the present device were also found to be significantly more tender using methods such as Warner Bratzler Shear (WBS) and a group of trained panelists. Using a cooked meat tenderness threshold of 4.0 Kg for WBS, the tenderness prediction was 91% accurate for longissimus dorsi (LD) meat aged for 7 days and 100% accurate for meat aged for 17 days. In addition, 71% and 87% of these carcasses exhibited cooked. LD meat WBS values below 3.5 Kg (very tender) after 7 and 17 days of aging, respectively.

It is believed that this method and apparatus would find greatest utility with respect to those beef carcasses that are graded low by the USDA inspectors, such as those that receive the "choice", "select" or utility grades. Meats produced from these carcasses using standard processing techniques command only a low market value. Using the device after USDA grading, the meat processor could determine with significant accuracy which carcasses in fact will produce tender meats. Those meats could be identified and labeled for sale in such fashion as to distinguish them as a higher quality meat despite the relatively low grade received under the qualitative USDA inspection process. As a result, such meats could command a higher return for the processor, while providing the consumer with more accurate information concerning the quality of the meats being purchased.

This method and apparatus may be employed in a number of applications beyond the prediction of tenderness for a particular carcass being tested. In particular, the apparatus described herein may be employed as one element of a screening method for determining the tendencies of particular breeds or lineages of cattle or swine to yield tender meats. It is believed that in the near future, the United States government will begin requiring that every cattle carcass be marked in such a manner that its source may be identified up through the slaughtering process. This identification may be performed, for example, by means of a radio frequency identification (RFID) tag attached to or implanted within the animal. By matching identification information for a particular carcass with tenderness information derived from the apparatus described above, it will be possible to investigate genetic determinants of tenderness through known statistical methods. Using this information, the genetics of the overall population may be improved through selectively breeding for animals that produce more tender meats. The result will be an overall increase in the quality of the beef cattle and swine produced in the United States, and a concomitant general increase in the value of animals produced within these industries.

The present invention has been described with reference to certain preferred and alternative embodiments that are intended to be exemplary only and not limiting to the full scope of the present invention as set forth in the appended claims.

What is claimed is:

1. An apparatus for predicting meat tenderness by the testing of a raw meat carcass, comprising:
   (a) a blunt blade comprising a flat tip adapted to penetrate the carcass;
   (b) a measuring instrument in communication with said blade, wherein said measuring instrument measures at the blade at least one of the group comprising force and energy and stress; and
   (c) a calculating device in communication with the measuring instrument, wherein the calculating device is operable to receive as an input a measurement from the measuring instrument and output a tenderness indicator and further comprises a total energy module operable to receive as input a force-penetration curve and calculate a total shear energy.

2. The apparatus of claim 1, wherein said blunt blade comprises a plurality of blades.

3. The apparatus of claim 2, wherein said plurality of blades comprises three blunt blades.

4. The apparatus of claim 1 further comprising a controller, wherein the controller is capable of controlling the depth and speed of the penetration of the blade.

5. An apparatus for testing a meat carcass for the purpose of discriminating between tough and tender meats, comprising:
   (a) a blunt blade comprising a flat tip adapted to penetrate the meat carcass;
   (b) a measuring instrument in communication with said blade, wherein said measuring instrument comprises at least one strain gauge;
   (c) a controller in communication with said measuring instrument, wherein said controller is capable of controlling the depth and speed of penetration of the blade into the carcass, and wherein the controller comprises a first module operable to calculate a total shear energy for the carcass based on a set of shear force readings derived from the measuring instrument; and
   (d) a calculating device in communication with the measuring instrument, wherein said calculating device is operable to receive as an input data from said measuring instrument and output a tenderness indicator.

6. The apparatus of claim 5, wherein the measuring instrument is operable to provide a shear force reading accurate to within one percent of the shear force reading within at least a portion of the operational shear force range.

7. The apparatus of claim 5, wherein said controller comprises a second module operable to output a result discriminating between tough and tender meats based upon the total shear energy for the carcass.

8. The apparatus of claim 7, wherein said second module comprises a total shear energy threshold, and is operable to compare the total shear energy for the carcass to the total shear energy threshold to generate the result discriminating between tough and tender meats.

9. The apparatus of claim 8, wherein the total shear energy threshold is about 150 N·mm.

10. An apparatus for discriminating between tough and tender meats, comprising:
   (a) a blunt blade comprising a flat tip;
   (b) a measuring instrument in communication with said blade, wherein said measuring instrument comprises at least one strain gauge operable to provide a shear force reading accurate to within one percent of the shear force reading within at least a portion of the operational shear force range;
   (c) a controller in communication with said measuring instrument, wherein said controller is capable of controlling the depth and speed of penetration of the blade; and
   (d) a calculating device in communication with the measuring instrument, wherein said calculating device is operable to receive as an input data from said measuring instrument and output a tenderness indicator.

11. An apparatus for determining whether meat is either tough or tender, comprising:
   (a) a blunt blade comprising a flat tip;
   (b) a measuring instrument in communication with said blade, wherein said measuring instrument comprises at least one strain gauge;
   (c) a controller in communication with said measuring instrument, wherein said controller is capable of controlling the depth and speed of penetration of the blade and said controller comprises a first module operable to calculate a total shear energy for the meat based on a set of shear force readings derived from said measuring instrument; and
   (d) a calculating device in communication with the measuring instrument, wherein said calculating device is operable to receive as an input data from said measuring instrument and output a tenderness indicator.

12. The apparatus of claim 11, wherein said controller further comprises a second module operable to output a result based upon the total shear energy for the meat and to compare the total shear energy for the meat to the total shear energy threshold to generate a result determining whether the meat is tough or tender.

13. The apparatus of claim 12, wherein the total shear energy threshold is about 150 N·mm.

* * * * *